ized June 5, 1962

3,037,950
ALLYLIDENE-TYPE PHOSPHORUS COMPOUNDS AND POLYMERS DERIVED THEREFROM

Samuel C. Temin, Pittsburgh, Pa., assignor to Koppers Company, Inc., a corporation of Delaware
No Drawing. Filed Dec. 8, 1960, Ser. No. 74,465
18 Claims. (Cl. 260—17.4)

This invention relates to unsaturated acetal and spiro phosphorous compounds and polymers derived therefrom. In one specific aspect, it relates to novel phosphorous compounds made by condensing a phosphonium halide, containing a plurality of hydroxyl, with an unsaturated aldehyde. In a further aspect, it relates to insoluble, infusible resins prepared by heat reacting the condensation product of the phosphonium halide with the olefinic aldehyde.

In the field of protective coatings, considerable effort has been expended in recent years in a search for heat-resistant coatings which are capable of imparting a flame retardant quality to the coated substrate. Numerous phosphorous-containing compounds have been proposed as starting materials or coatings of this type, although the products derived therefrom in many cases lack the desired high heat stability. Quite surprisingly, I have discovered a novel type of phosphorous-containing condensation product having an acetal or a rigid spiro-type configuration. This water-soluble, oil-insoluble condensation product is capable per se of imparting flame retarding or flame proofing properties to a variety of materials (cf. Example VI, infra). It is particularly useful in that it is easily converted by a method described in detail hereafter to a polymeric structure, characterized at least in part by a rigid spiro-type configuration, which has remarkable flame-retarding properties and the desired quality of high heat stability required in many coating applications.

It is, therefore, an object of the present invention to provide a novel class of heterocyclic phosphorous-containing compounds and their condensation products. It is a further object to provide heat-stable, phosphorous-containing resins composed at least partially of a spiro-type configuration, which are remarkably effective as ingredients in flame-retarding coatings or useful per se as rigid flame resistant plastics or resins.

In accordance with the present invention, the unsaturated-acetal or spiro-type phosphorous-containing condensation products are prepared by reacting under acidic conditions a phosphonium halide of the formula:

$$(HOCHR)_4P^+X^-$$

wherein R is a hydrogen or lower alkyl and X is a halogen with an unsaturated aldehyde of the formula:

$$\underset{\underset{CH=C-CHO}{|\quad\quad|}}{R_1\quad R_2}$$

wherein $R_1$ and $R_2$ are selected from the group consisting of hydrogen, lower alkyl, halo and phenyl, to form a water-soluble, fusible condensation product. The condensation product can be used as such or it can be further heat treated either by itself or in the presence of a curing agent, to form a cross-linked, insoluble phosphorous-containing resin.

The nature of the condensation products of the invention are perhaps better understood by referring to the following reaction sequence. In the reaction sequence, R, $R_1$, $R_2$ and X have the values given hereabove.

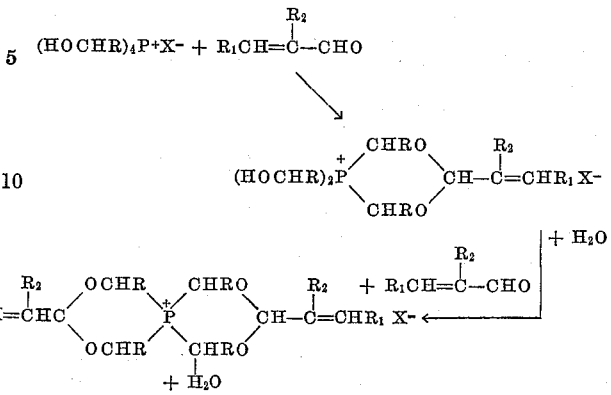

Thus, it can be seen that if only one mole of unsaturated aldehyde is reacted with the phosphonium halide, a mono-acetal is formed as the major reaction product. If at least 2 moles of aldehyde are present, the resulting product is largely a diacetal or spiro compound. While the above reaction sequence is indicative of the general course of the reaction, it is very possible that, under certain conditions, the condensation product will consist of mixed acetals or higher condensation products.

The basic starting materials for preparing the condensation products of the invention are the tetrakis(hydroxymethyl)phosphonium halides and tetrakis(hydroxy lower alkyl)phosphonium halides. While these compounds are readily available commercially, if desired, they may be made from various aldehydes, phosphine and HCl.

As I have noted, the useful olefinic aldehydes of the invention are those having the formula:

$$R_1-CH=CR_2-CHO$$

wherein $R_1$ and $R_2$ are members selected from the group consisting of hydrogen, lower alkyl, halo and phenyl. Thus, suitable aldehydes include, but are not limited to, acrolein, methacrolein, α-ethylacrolein, α-chloroacrolein, α-phenylacrolein, crotonaldehyde, cinnamaldehyde, and β-chloroacrolein or mixtures thereof.

The reaction between the phosphonium halide and the olefinic aldehyde occurs under acidic conditions. No catalyst need be added to the reaction mixture, since the phosphonium halide itself is a strong enough acid to function as a catalyst. If desired, an acid catalyst can be used to speed up the reaction or to permit the reaction to go at a reasonable rate in the lower portion of the operable temperature range. Suitable catalysts include p-toluenesulfonic acid, benzenesulfonic acid, m-benzenedisulfonic acid, ethanesulfonic acid, naphthalenesulfonic acid, dimethyl sulfate, phosphoric acid, sulfuric acid, hydrochloric acid, thichloroacetic acid and the like. Also useful are catalysts of the Friedel-Crafts type, including the chlorides of aluminum, iron, boron, tin, titanium, zinc, magnesium, and calcium. If a catalyst is used, it is conveniently added in an amount ranging between about 0.2–5% by weight based on the weight of phosphonium compound, preferably in the range of 0.4–1% by weight.

It can be seen from the foregoing equations that the nature of the product is influenced by the mole ratio of phosphonium halide to olefinic aldehyde. If it is desired to prepare the spiro compound, e.g. bis[allylidene-bis(oxymethyl)]phosphonium chloride from tetrakis(hydroxymethyl)phosphonium chloride and acrolein, it is necessary to use at least 2 moles of aldehyde per mole of phosphonium halide. If mainly the mono adduct, e.g. bis-(hydroxymethyl)allylidene bis(oxymethyl)phosphonium chloride is desired, only one mole of aldehyde per mole of phosphonium halide is required. In either case, it is convenient to use an amount of aldehyde slightly in excess of the stoichiometric requirement to insure complete reaction, since the aldehyde can be easily recovered and recycled for use in a subsequent preparation. Acceptable mole ratios of phosphonium halide to aldehyde vary between about 1:1.3–1:7. Since the use of a large excess of aldehyde requires additional recovery facilities, the preferable mole ratio for the reaction is between 1:1.3 and 1:2.5.

The reaction is conducted at a temperature of about 40–100° C. If the temperature is below about 40° C., there is insufficient reaction within a reasonable time. If temperatures higher than 100° C. are used, there is a tendency for further condensation or cross-linking of the product, which is undesirable if the condensation product is to be used as such or if it is to be further condensed with, for example, polyhydroxy compounds or carbamates in the manner hereafter described. A preferred temperature range is between 60 and 85° C.

The reaction works well at atmospheric pressure, although higher or lower pressures could be used if desired. The use of reduced pressure is undesirable in the beginning of the reaction unless a very high boiling aldehyde is used as a reactant. Toward the end of the reaction, the use of reduced pressures of e.g. 10–100 mm. of Hg is quite helpful in removing the water formed during the reaction and any unreacted aldehyde, since such pressures make it possible to remove volatile components from viscous fluids without resorting to excessive temperatures. The reaction is preferably conducted under an atmosphere of nitrogen or other inert gas to avoid possible discoloration of the products.

The reaction is generally complete in 1½ to 5 hours, although the exact reaction time is influenced considerably by the nature of the specific reactants used, the catalyst concentration (if one is used), and by the temperature of the reaction. If it is desired to form the condensation product and cure in one operation, higher catalyst concentrations in the range of about 1% by weight catalyst, a reaction time of about 5 hours, and elevated temperatures, e.g. over 90° C. are used. Such conditions generally produce a three-dimensional hard, insoluble resin. Shorter reaction times give the water-soluble, fusible resins.

The water-soluble, oil-insoluble condensation product is obtained by the method described hereabove in the form of a colorless, viscous fluid. This condensation product is used as such, or it is converted into a solid, insoluble infusible resin by (a) further heat treatment in the presence of additional acid catalyst, (b) heat treatment with polyhydroxy compounds in the presence of acid catalyst, (c) heat treatment in the presence of a free radical-type catalyst, (d) heat treatment with carbamates, e.g. urea, (e) heat treatment with dicarboxylic acids, (f) heat treatment with polyamines and (g) heat treatment with vicinal epoxy compounds.

Specific curing conditions using the techniques noted hereabove are as follows:

(a) If no other additive or curing agent is used, the cure may be effected using a strong acid catalyst at least equal to hydrochloric acid in strength. The mineral acids, such as sulfuric acid and hydrochloric acid, are preferred for this purpose and are used in an amount ranging between 0.5–5% by weight based upon the weight of the condensation product. The condensation product is heated in the presence of a catalyst at a temperature of 75–125° C., preferably at a temperature of 80–100° C., for 2–24 hours, preferably 4–8 hours. With strong acid catalysts, the major polymerization reaction is probably the reaction of free hydroxyl groups with the active double bond of the acetal group.

(b) If a polyhydroxy compound is used as a curing agent, it is desirable that it be present in an amount corresponding to one hydroxyl group per acetal linkage in the condensation product. For the sake of convenience, the polyhydroxy compound is used in an amount ranging between 10 and 50% by weight based upon the weight of condensation product. Suitable polyhydroxy compounds include hexamethyleneglycol, trimethylolpropane, glycerol, 1,2,6-hexanetriol, sorbitol, mannitol, trimethylolethane, triethanolamine, and 1,2,4-butanetriol. Polymeric polyhydroxy materials such as cellulose, starch, and polyvinyl alcohol can be used. The phenol-aldehyde Novolac resins and bis-phenols are also useful as polyhydroxy curing agents.

(c) If a free radical catalyst is used to effect curing, the temperature chosen depends upon the decomposition temperature of the particular catalyst used. For example, benzoyl peroxide decomposes at a reasonable rate at about 80° C. and thus is most effective at such temperatures, whereas t-butyl perbenzoate has a useful decomposition rate in the neighborhood of 120° C. and should be used in this temperature range. Other useful organic peroxides include lauroyl peroxide, azobis(isobutyronitrile), di-t-butyl peroxide, succinic acid peroxide, cyclohexane peroxide, hydroxyheptyl peroxide, and t-butyl hydroperoxide. The catalyst concentration is preferably within the range of 0.1–2% by weight based upon the weight of the condensation product to be cured. Using the free radical type catalyst, the mechanism by which the insoluble resin is formed involves addition polymerization through the residual unsaturated linkages of the acetals.

(d) If curing is effected using a carbamate, such as urea, the temperature ranges between 60 and 120° C., preferably between 80 and 100° C. The amount of carbamate used is between 0.1 part to 0.5 part carbamate for each part of condensation product.

(e) Di- or polycarboxylic acids may be used similarly in cures. Temperatures ranging between 60° and 120° C., preferably 70 to 90°, can be used with a ratio, by weight, of from about 5:1 to 1.5:1 of condensate to acid. Suitable acids are maleic, fumaric, adipic, sebacic, glutaric, phthalic, butane-1,2,3-dicarboxylic, and mellitic.

(f) Polyamines can also be used in cures under conditions similar to those used with the polycarboxylic acids. Suitable amines are ethylenediamine, tetramethylenediamine, hexamethylenediamine, xylylene diamines, diethylenetriamine, triethylenetetramine, and the like.

(g) Vicinal-type epoxy resins are particularly useful as curing agents for the condensation products of the invention. For example, an effective cure is obtained by mixing a homogeneous blend of 10 parts condensation product, 3 parts sorbitol, and 0.1 part ethanesulfonic acid with 2–7 parts liquid epoxy compound, such as resorcinol diglycidyl ether. An additional 0.1 part ethanesulfonic acid is added to the mix and it is thereafter spread on a metal or plastic surface and heated for 12 hours at 90° C. to form an insoluble, infusible resin.

The physical properties of the cured products vary according to the additive used in the cure. The products may range in impact strength (Izod) from 0.25 to 1.50 ft.-lbs. per inch of notch, show hardness ranging from rubber-like consistency to a Rockwell hardness of M–100, and exhibit heat distortion temperatures ranging from 35° to over 150° C. With no additives, hard clear resins of good impact strength can be obtained. In general, products similar thereto are obtained with mannitol, sorbitol, triethanolamine, and the like. Rubbery products can be obtained using aliphatic dicarboxylic acids and polyamines. The incorporation of plasticizers will affect the physical properties of the product.

The products are useful in many plastic applications, but particularly where fire resistance is desired. They can be employed, in general, in molding or laminating applications where other thermosetting resins are used. As coatings, they may be applied to plastic films, foils, and molded objects. This use is of particular advantage where the physical properties of the substrate are desired, either because of some special characteristic or economic considerations, and, in addition, fire-resistance is required.

The uncured resins have great utility in the fireproofing of cellulosic materials such as wood, cotton, rayon, and the like, since these resins react with cellulose in the presence of heat. The solubility of the uncured resins in water makes their incorporation or addition, before cure, quite simple.

My invention is further illustrated by the following examples:

*Example I*

To 36 parts of tetrakis(hydroxymethyl)phosphonium chloride, recrystallized from isopropanol-acetic acid, was added 25 parts of distilled acrolein containing 0.2 part of hydroquinone inhibitor. The reaction mixture was stirred under a nitrogen blanket in a round bottom flask fitted with a water-cooled condenser and heated by a water bath. The reactants were stirred for 15 minutes at 60° C. until a clear, viscous sirup was obtained. Then 0.2 part of p-toluenesulfonic acid monohydrate was added and the reaction mixture was thereafter stirred for 45 minutes at 80–85° C. The condenser was removed, the flask then connected to a vacuum source and the heating was continued for an additional 45 minutes at 15 mm. pressure. The product was a sticky, viscous, water-soluble oil.

To 10 parts of this condensation product was added 3 parts of triethanolamine and 0.1 part of p-toluenesulfonic acid monohydrate. The mixture was blended and then heated at 105° C. for 4 hours. A clear, hard, water-insoluble resin was obtained. Specimens tested show that the resin has a heat distortion temperature of 65° C., and an impact (Izod) of 0.4 ft.-lbs. per inch of notch. A thin bar could not be ignited in a Bunsen flame.

*Example II*

To 39 parts of tetrakis(hydroxymethyl)phosphonium chloride was added 14 parts of acrolein in three increments at 5 minute intervals. The reaction mixture was stirred and maintained at 75–80° C. under reflux for two hours. The condenser was removed and the reaction mixture stirred and heated at 75–80° C. and 15 mm. pressure for two additional hours. The slightly viscous, colorless oil gave analyses intermediate that expected for the diacetal, bis[allylidene - bis(oyxmethyl)]phosphonium chloride and the monoacetal, bis(hydroxymethyl)allylidene bis(oxymethyl)phosphonium chloride. When 0.2 part of p-toluenesulfonic acid was added to 10 parts of this liquid resin and the mixture heated for 4 hours at 105° C., a clear, hard resin was obtained. A thin specimen was found non-flammable.

*Example III*

A condensate similar to those previously described was prepared by heating 21.6 parts of tetrakis(hydroxymethyl)-phosphonium chloride, 10.5 parts of acrolein, and 0.1 part of p-toluenesulfonic acid at 60–70° C. for 4 hours. This material was then heated for one hour at 60–70° C. and 30 mm. pressure to obtain a very viscous oil which poured only when hot.

To 6 parts of this condensate was added 1.5 parts mannitol and 0.4 part p-toluenesulfonic acid. After heating for 4 hours at 110° C., a hard, solid resin was obtained.

*Example IV*

With an additional six parts of the condensate of Example III, there was mixed 0.06 part of azobis(isobutyronitrile). The mixture was heated for 4 hours at 110° C. to give a hard, insoluble resin.

*Example V*

A condensation product was prepared by heating 21.6 parts of tetrakis(hydroxymethyl)phosphonium chloride, 12.5 parts of acrolein and 0.1 part of p-toluenesulfonyl chloride for 2 hours at 60–65° C.

One part of this condensate was mixed with 0.25 part of mannitol and 0.08 part of anhydrous zinc chloride. The mixture was heated for 4 hours at 125° C. to give a hard, insoluble polymer. According to ASTM D635–44, a specimen bar was found to be self-extinguishing.

*Example VI*

A condensation product was prepared as in Example III. To 10 parts of this material was added 2 parts of urea and the mixture was heated for 4 hours at 125° C. A hard, insoluble resin was obtained.

*Example VII*

A condensation product was prepared as in Example II. A 25% aqueous solution of this material, to which 1% by weight $ZnCl_2$, based on the weight of the resin, was added, was used to impregnate a wooden splint. The splint was dried at 110° C. to form a reaction product between the condensation product and the cellulose, and then placed in the flame of a Bunsen burner. No combustion occurred although the splint blackened in the flame.

I claim:

1. Method of making phosphorous-containing condensation products comprising heat reacting at a temperature of from 40°–100° C. under acid conditions a phosphonium halide of the formula:

$$(HOCHR)_4P^+X^-$$

wherein R is a member selected from the group consisting of hydrogen and lower alkyl and X is halogen with an olefinic aldehyde of the formula:

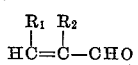

wherein $R_1$ and $R_2$ are members selected from the group consisting of hydrogen, lower alkyl, halo, and phenyl, the mole ratio of said phosphonium compound to said aldehyde being from 1:1.3–1:7, to form a water-soluble fusible condensation product.

2. Method of making phosphorous-containing polymers comprising heat reacting at a temperature of from 40°–100° C. in the presence of a catalytic amount of a strong acid, a phosphonium halide of the formula:

$$(HOCHR)_4P^+X^-$$

wherein R is a member selected from the group consisting of hydrogen and lower alkyl and X is halogen with an olefinic aldehyde of the formula:

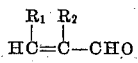

wherein $R_1$ and $R_2$ are members selected from the group consisting of hydrogen, lower alkyl, halo, and phenyl, the mole ratio of said phosphonium compound to said aldehyde being from 1:1.3–1:7, to form a water-soluble fusible condensation product, and thereafter thermosetting the condensation product to form a cross-linked insoluble resin.

3. Method according to claim 2 wherein curing is effected in the presence of a strong acid catalyst.

4. Method according to claim 2 wherein curing is effected in the presence of a free radical catalyst.

5. Method of making a phosphorous-countaining polymer comprising reacting a phosphonium compound of the formula:

$$(HOCHR)_4P^+X^-$$

wherein R is a member selected from the group consisting of hydrogen and lower alkyl and X is halogen with an olefinic aldehyde of the formula:

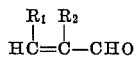

wherein $R_1$ and $R_2$ are members selected from the group consisting of hydrogen, lower alkyl, halo and phenyl in the presence of a catalytic amount of an acid catalyst at a temperature of 40–100°C., the mole ratio of said phosphonium compound to said aldehyde being between 1:1.3 to 1:7, to form a water-soluble, oil-insoluble condensation product, and thermosetting said condensation product by heating it in the presence of a curing agent selected from the group consisting of carbamate, cellulose, polyhydroxy compound, vicinal epoxy compound and polycarboxylic acid to form an insoluble, infusible phosphorous-containing resin.

6. A phosphorous-containing condensation product prepared by the steps comprising reacting a phosphonium compound of the formula:

$$(HOCHR)_4P^+X^-$$

wherein R is a member selected from the group consisting of hydrogen and lower alkyl and X is halogen with an olefinic aldehyde of the formula:

$$\begin{array}{cc} R_1 & R_2 \\ | & | \\ HC=C-CHO \end{array}$$

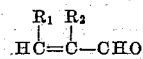

wherein $R_1$ and $R_2$ are members selected from the group consisting of hydrogen, lower alkyl, halo, and phenyl, to form a water-soluble fusible condensation product at a temperature of 40–100° C., the mole ratio of said phosphonium compound to said aldehyde being between 1:1.3 to 1:7, to form a water-soluble, oil insoluble condensation product.

7. A phosphorus-containing polymer prepared by the steps comprising reacting a phosphonium compound of the formula:

$$(HOCHR)_4P^+X^-$$

wherein R is a member selected from the group consisting of hydrogen and lower alkyl and X is halogen with an olefinic aldehyde of the formula:

$$\begin{array}{cc} R_1 & R_2 \\ | & | \\ HC=C-CHO \end{array}$$

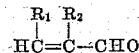

wherein $R_1$ and $R_2$ are members selected from the group consisting of hydrogen, lower alkyl, halo and phenyl in the presence of a catalytic amount of an acid catalyst at a temperature of 40–100° C., the mole ratio of said phosphonium compound to said aldehyde being between 1:1.3 to 1:7, to form a water-soluble, oil-insoluble condensation product and thermosetting said condensation product to form an insoluble infusible phosphorous-containing resin.

8. Bis(hydroxymethyl)allylidene bis(oxymethyl)phosphonium chloride.

9. Bis[allylidene - bis(oxymethyl)]phosphonium chloride.

10. Method of making a phosphorous-containing condensation product comprising reacting tetrakis(hydroxymethyl) phosphonium chloride with acrolein in the presence of a strong acid catalyst at a temperature of 60–85° C., the mole ratio of phosphonium chloride to acrolein being the range of 1:1.3 to 1:2.5, to form said condensation product.

11. Method of making a phosphorous-containing polymer comprising reacting tetrakis(hydroxymethyl) phosphonium chloride with acrolein in the presence of a strong acid catalyst at a temperature of 60–85° C., the mole ratio of phosphonium chloride to acrolein being the range of 1:1.3 to 1:2.5, to form a condensation product and thermosetting the condensation product by further heating at a temperature of 75–125° C. in the presence of a strong acid catalyst to form an insoluble, infusible phosphorous-containing resin.

12. Method of making a phosphorous-containing polymer comprising reacting tetrakis(hydroxymethyl) phosphonium chloride with acrolein in the presence of a strong acid catalyst at a temperature of 60–85° C., the mole ratio of phosphonium chloride to acrolein being the range of 1:1.3 to 1:2.5, to form a condensation product and curing the condensation product by further heating at a temperature of 75–125° C. in the presence of a strong acid to form an insoluble, infusible phosphorous-containing resin.

13. Method of making a phosphorous-containing polymer comprising reacting tetrakis(hydroxymethyl) phosphonium chloride with acrolein at a temperature of 60–85° C., the mole ratio of phosphonium chloride to acrolein being the range of 1:1.3 to 1:2.5, to form a condensation product and thermosetting the condensation product by further heating at a temperature of 60–120° C. in the presence of a curing agent selected from the group consisting of carbamate, cellulose, polyhydroxy compound, vicinal epoxy compound and polycarboxylic acid to form an insoluble, infusible phosphorous-containing resin.

14. Method according to claim 13 wherein said curing agent is a carbamate.

15. Method according to claim 13 wherein said curing agent is cellulose.

16. Method according to claim 13 wherein said curing agent is a polyhydroxy compound.

17. Method according to claim 13 wherein said curing agent is a vicinal epoxy compound.

18. Method according to claim 13 wherein said curing agent is a polycarboxylic acid.

References Cited in the file of this patent
UNITED STATES PATENTS

| | | |
|---|---|---|
| 2,957,856 | Guest et al. | Oct. 25, 1960 |
| 2,969,398 | Buckler | Jan. 24, 1961 |